US012777533B2

(12) United States Patent
Esswie

(10) Patent No.: US 12,777,533 B2
(45) Date of Patent: Oct. 27, 2026

(54) NON-TERRESTRIAL UPLINK TRAFFIC RELAYING

(71) Applicant: Dell Products L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 287 days.

(21) Appl. No.: 18/598,633

(22) Filed: Mar. 7, 2024

(65) Prior Publication Data

US 2025/0287435 A1 Sep. 11, 2025

(51) Int. Cl.

| | |
|---|---|
| ***H04W 76/10*** | (2018.01) |
| ***H04B 17/318*** | (2015.01) |
| ***H04W 52/14*** | (2009.01) |
| ***H04W 84/06*** | (2009.01) |

(52) U.S. Cl.

CPC .......... *H04W 76/10* (2018.02); *H04B 17/328* (2023.05); *H04W 52/146* (2013.01); *H04W 84/06* (2013.01)

(58) Field of Classification Search

CPC ... H04W 76/10; H04W 52/146; H04W 84/06; H04B 17/328

USPC .......................................................... 370/329

See application file for complete search history.

(56) References Cited

U.S. PATENT DOCUMENTS

| | | | | |
|---|---|---|---|---|
| 12,245,051 | B2 * | 3/2025 | Kumar | H04B 7/18519 |
| 2015/0189567 | A1 * | 7/2015 | Srivastava | H04W 36/302 370/332 |
| 2015/0327018 | A1 | 11/2015 | Rehnberg | |
| 2021/0036769 | A1 | 2/2021 | Sorond | |

(Continued)

FOREIGN PATENT DOCUMENTS

EP 4598153 A1 * 8/2025 ......... H04L 27/2607

OTHER PUBLICATIONS

Esswie, Ali. "Disaggregated Traffic Delivery via a Non-Terrestrial Network" U.S. Appl. No. 18/598,643, filed Mar. 7, 2024, 72 pages.

(Continued)

*Primary Examiner* — Peter G Solinsky

(74) *Attorney, Agent, or Firm* — Amin, Turocy & Watson, LLP

(57) ABSTRACT

A communication session between a non-terrestrial network node and a user equipment may comprise non-terrestrial uplink and downlink traffic. A terrestrial radio network node may indicate a service class to the user equipment indicative that the terrestrial node is enabled to relay non-terrestrial uplink traffic that has been disaggregated from the communication session. Based on an error rate or a signal strength corresponding to the user equipment transmitting the non-terrestrial uplink traffic to the non-terrestrial node or based on a battery charge level or transmit power level corresponding to the user equipment, a determination may be made to offload delivery of some of, or all of, the non-terrestrial uplink traffic for relaying by the terrestrial node. Indication (Continued)

700 of the service class in a connection establishment request transmitted by the user equipment to the terrestrial node may result in the terrestrial node relaying the offloaded non-terrestrial uplink traffic.

20 Claims, 12 Drawing Sheets

(56) References Cited

U.S. PATENT DOCUMENTS

| | | | | |
|---|---|---|---|---|
| 2023/0164580 | A1* | 5/2023 | Cui | H04W 8/24 370/329 |
| 2024/0040608 | A1 | 2/2024 | Lee | |
| 2024/0340747 | A1* | 10/2024 | Li | H04W 36/00 |
| 2024/0349101 | A1* | 10/2024 | Hwang | H04L 5/0032 |
| 2024/0405857 | A1* | 12/2024 | Ji | H04B 7/18539 |
| 2025/0038832 | A1* | 1/2025 | Shrestha | H04B 7/18515 |
| 2025/0056299 | A1* | 2/2025 | Sayed Hassan | H04W 52/243 |
| 2025/0056365 | A1* | 2/2025 | Medeiros De Amorim | H04W 36/00835 |
| 2025/0070951 | A1* | 2/2025 | Zhou | H04B 7/18541 |
| 2025/0081066 | A1* | 3/2025 | Khoshkholgh Dashtaki | H04W 56/0045 |
| 2025/0081160 | A1* | 3/2025 | Saha | H04W 76/20 |
| 2025/0088929 | A1* | 3/2025 | Sayed Hassan | H04W 52/0206 |
| 2025/0088957 | A1* | 3/2025 | Uchino | H04W 48/18 |
| 2025/0106718 | A1* | 3/2025 | Agarwal | H04W 8/183 |
| 2025/0113203 | A1* | 4/2025 | Zhou | H04W 16/14 |
| 2025/0113305 | A1* | 4/2025 | Ahmadian Tehrani | H04W 52/08 |
| 2025/0142431 | A1* | 5/2025 | Lee | H04W 36/0072 |
| 2025/0175920 | A1* | 5/2025 | Lee | H04W 56/0015 |
| 2025/0175944 | A1* | 5/2025 | Sheik | H04W 68/02 |
| 2025/0184828 | A1* | 6/2025 | Ou | H04W 48/02 |
| 2025/0212081 | A1* | 6/2025 | Luo | H04B 7/18541 |
| 2025/0267712 | A1* | 8/2025 | Yin | H04J 13/0044 |
| 2025/0306841 | A1* | 10/2025 | Yu | H04L 65/1093 |
| 2025/0350315 | A1* | 11/2025 | Besquin | H04B 1/69 |
| 2025/0358806 | A1 | 11/2025 | Khamse-Ashari | |
| 2026/0025775 | A1 | 1/2026 | Sun | |
| 2026/0040165 | A1* | 2/2026 | Wang | H04W 36/0085 |
| 2026/0095244 | A1* | 4/2026 | Healy | H04B 7/18513 |
| 2026/0095837 | A1* | 4/2026 | Healy | H04W 40/02 |

OTHER PUBLICATIONS

Notice of Allowance mailed Apr. 7, 2026 for U.S. Appl. No. 18/598,643, 44 pages.

* cited by examiner

NON-TERRESTRIAL UPLINK TRAFFIC RELAYING

BACKGROUND

The 'New Radio' (NR) terminology that is associated with fifth generation mobile wireless communication systems ("5G") refers to technical aspects used in wireless radio access networks ("RAN") that comprise several quality of service classes ("QoS"), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise receiving, by a user equipment comprising at least one processor from a terrestrial radio network node, a service class relaying indication message comprising a first service class indication indicative of a service class corresponding to the terrestrial radio network node being configured to facilitate delivery of at least a portion of non-terrestrial traffic corresponding to a communication session between the user equipment and a non-terrestrial network node. The method may further comprise determining, by the user equipment, that the delivery of at least the portion of non-terrestrial traffic is to be facilitated by the terrestrial radio network node and transmitting, by the user equipment to the terrestrial radio network node, a connection establishment request message comprising a second service class indication indicative of the service class. Based on the transmitting of the connection establishment request message, the method may further comprise establishing, by the user equipment, a connection with the terrestrial radio network node to result in an established connection. The method may comprise transmitting, by the user equipment to the terrestrial radio network node according to the established connection, at least a portion of at least the portion of non-terrestrial traffic. The connection establishment request message may further comprise a non-terrestrial network node identifier corresponding to the non-terrestrial network node. The established connection may be a connection that only facilitates relaying of non-terrestrial uplink traffic offloaded, or disaggregated, from being delivered by the user equipment to the non-terrestrial network node.

In an embodiment, the determining that the delivery of at least the portion of non-terrestrial traffic is to be facilitated by the terrestrial radio network node may comprise receiving, from the non-terrestrial network node, a traffic-relaying indication indicative that the user equipment is to offload the delivery of at least the portion of non-terrestrial traffic to the terrestrial radio network node. The traffic-relaying indication may be transmitted by the non-terrestrial network node based on a determination, by the non-terrestrial network node, that a signal strength corresponding to the user equipment is not greater than a strength value specified by a configured uplink transmission signal strength criterion. The traffic-relaying indication may be transmitted by the non-terrestrial network node based on a determination, by the non-terrestrial network node, that an uplink error rate corresponding to uplink traffic received by the non-terrestrial network node from the user equipment is not less than an error rate value specified by an uplink error rate criterion.

In an embodiment, the determining that the delivery of at least the portion of non-terrestrial traffic is to be facilitated by the terrestrial radio network node may comprise determining that a battery charge value corresponding to the user equipment is not greater than a battery charge threshold specified by a configured battery charge criterion.

In an embodiment, wherein the determining that the delivery of at least the portion of non-terrestrial traffic is to be facilitated by the terrestrial radio network node may comprise determining that an uplink transmission power corresponding to transmission of uplink traffic is to be not greater than a transmission power specified by a configured uplink traffic transmission power criterion.

In an embodiment, the method may further comprise transmitting, by the user equipment to the terrestrial radio network node, non-terrestrial control information corresponding to non-terrestrial downlink traffic associated with the communication session between the user equipment and a non-terrestrial network node.

In an embodiment, the method may further comprise transmitting, by the user equipment to the terrestrial radio network node, non-terrestrial control information corresponding to non-terrestrial downlink traffic control information associated with the communication session between the user equipment and a non-terrestrial network node.

In an embodiment, at least the portion of non-terrestrial traffic may comprise uplink traffic associated with the communication session between the user equipment and the non-terrestrial network node. In an embodiment, the service class relaying indication message may be broadcast by the terrestrial radio network node in a system information block message. In an embodiment, the user equipment operates in an idle mode with respect to the terrestrial radio network node before the established connection is established.

In another example embodiment, a user equipment may comprise at least one processor configured to process executable instructions that, when executed by the at least one processor, facilitate performance of operations, comprising receiving, from a terrestrial radio network node, a relaying service class message comprising a non-terrestrial uplink traffic relaying service class indication indicative of the terrestrial radio network node being configured to facilitate delivery of a non-terrestrial uplink traffic flow associated with an established non-terrestrial communication session between the user equipment and a non-terrestrial network node. The operations may further comprise determining that delivery of the non-terrestrial uplink traffic flow is to be facilitated by the terrestrial radio network node, establishing a terrestrial connection with the terrestrial radio network node to result in an established terrestrial connection, and transmitting, to the terrestrial radio network node via the established terrestrial connection, at least a portion of the non-terrestrial uplink traffic flow.

In an embodiment, the determining that the delivery of the non-terrestrial uplink traffic flow is to be facilitated by the terrestrial radio network node may comprise receiving, from the non-terrestrial network node, a traffic-relaying indication indicative that the user equipment is to offload the delivery of non-terrestrial uplink traffic flow to the terrestrial radio network node. In an embodiment, the determining that the delivery of the non-terrestrial uplink traffic flow is to be facilitated by the terrestrial radio network node may comprise determining that a battery charge value corresponding to the user equipment is not greater than a value defined by a configured battery charge criterion.

In an embodiment, the operations may further comprise transmitting, to the terrestrial radio network node, non-terrestrial control information corresponding to the established non-terrestrial communication session, wherein the non-terrestrial control information is to be directed, by the terrestrial radio network node, to the non-terrestrial network node.

In yet another example embodiment, a non-transitory machine-readable medium, may comprise executable instructions that, when executed by at least one processor of a user equipment, facilitate performance of operations, may comprise receiving, via a broadcast by a terrestrial radio network node using a system information block message, a non-terrestrial uplink traffic relaying service class indication indicative of the terrestrial radio network node being configured to facilitate delivery of a non-terrestrial uplink traffic flow associated with an established non-terrestrial communication session between the user equipment and a non-terrestrial network node. The operations may further comprise determining that delivery of the non-terrestrial uplink traffic flow is to be facilitated by the terrestrial radio network node, establishing a terrestrial connection with the terrestrial radio network node to result in an established terrestrial connection, and transmitting, to the terrestrial radio network node according to the established terrestrial connection, at least a portion of the non-terrestrial uplink traffic flow.

In an embodiment, the determining that the delivery of the non-terrestrial uplink traffic flow is to be facilitated by the terrestrial radio network node may comprise receiving, from the non-terrestrial network node, a traffic-relaying indication indicative that the user equipment is to offload the delivery of the non-terrestrial uplink traffic flow to the terrestrial radio network node.

In an embodiment, the user equipment may operate in an idle mode with respect to the terrestrial radio network node before the established terrestrial connection was established.

In an embodiment, the operations may further comprise transmitting, to non-terrestrial network node, a traffic-relaying indication indicative that the user equipment is to offload the delivery of the non-terrestrial uplink traffic flow to the terrestrial radio network node.

DETAILED DESCRIPTION OF THE DRAWINGS

Figure 1:
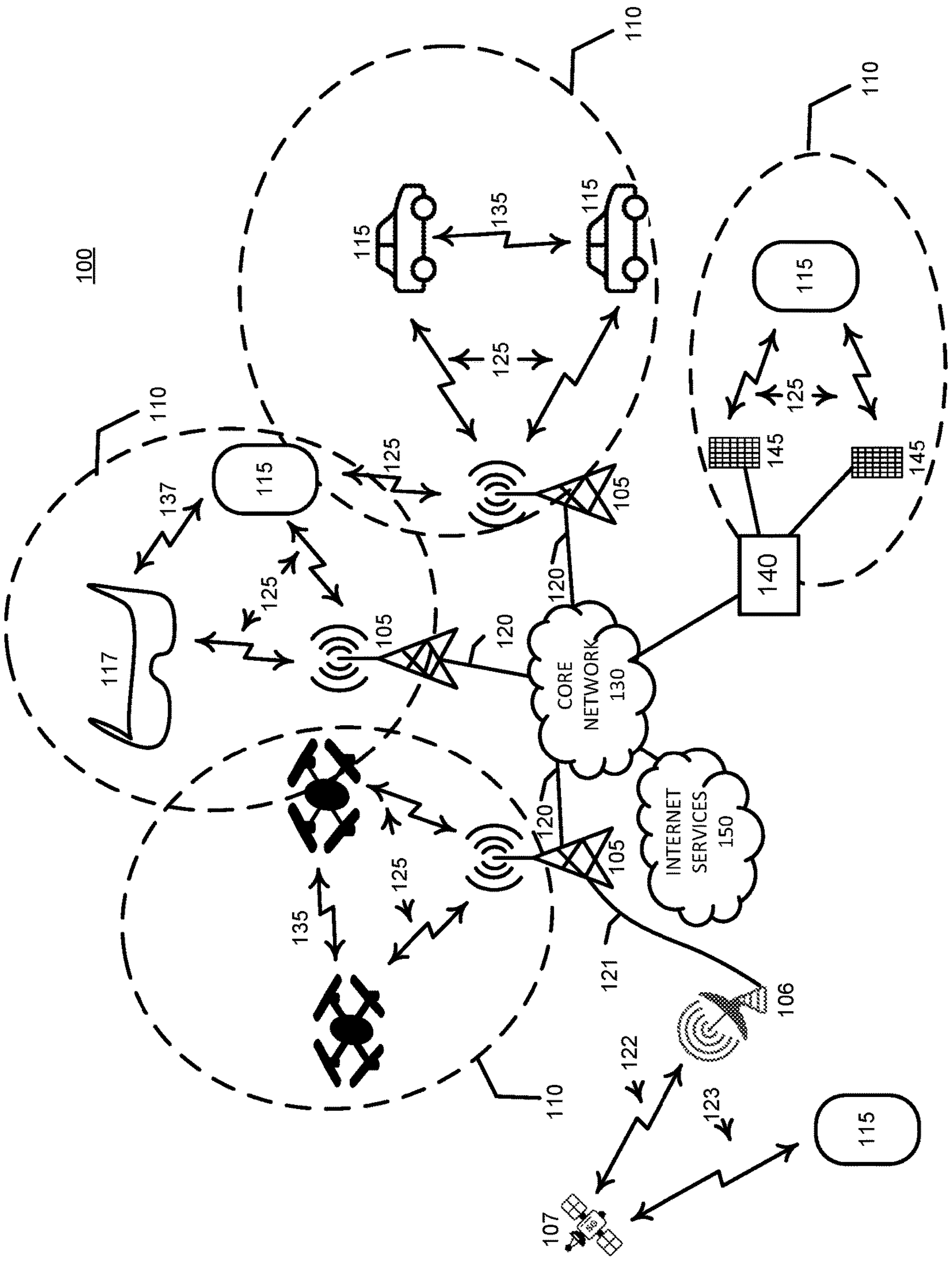
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 11.

Continuing with discussion of FIG. 1, base stations 105 may be dispersed throughout a geographic area to form the wireless communication system 100 and may be devices in different forms or having different capabilities. Base stations 105 and UEs 115 may wirelessly communicate via one or more communication links 125. A base station 105 may be referred to as a RAN node. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, a wireless transmit receive unit ("WTRU"), or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, an end extended reality appliance, an extended reality processing unit, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (eg., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or more component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The evolution of communication networks has witnessed remarkable advancements over the past decades. A significant extension of 5G's potential may lie beyond the conventional terrestrial infrastructure, giving rise to what are known as Non-Terrestrial Networks ("NTN").

Non-Terrestrial Networks may encompass a diverse range of technologies and architectures that may comprise space-based, airborne, and maritime platforms to enhance global communication capabilities. Integration of 5G and non-terrestrial environments may facilitate connectivity being established, maintained, and optimized to remote and under-served regions.

Satellites equipped with 5G capabilities constitute an aspect of 5G NTN. Satellites, positioned in low Earth orbit ("LEO"), medium Earth orbit ("MEO"), or geostationary orbit ("GEO"), may form an intricate web of interconnected nodes. The satellites can provide widespread coverage, offering high-speed data connections, low latency communication, and global mobility. Satellites may facilitate broadband access in rural and remote areas, disaster-stricken regions, and on moving vehicles, ships, and aircraft, thus bridging the digital divide.

Satellite-based NTN can bridge connectivity gaps in remote and rural areas, provide disaster recovery communication, and offer enhanced coverage for maritime and aeronautical services. High-altitude platforms and drones equipped with cellular capabilities can serve as temporary network relays for events, emergencies, or areas with signal-strength coverage deficiencies. such applications may benefit not only traditional voice and data services but also for technologies, such as, for example, Internet of Things ("IoT"), wherein connectivity is typically a desirable, or a fundamental requirement.

A non-terrestrial ground-based base station 106, which may comprise a satellite antenna, may be coupled to core network 130. Non-terrestrial base station 106 may communicate with satellite 107, which may communicate with a user equipment 115. Non-terrestrial base station 106, which may be referred to as a non-terrestrial network gateway, and satellite 107 may facilitate delivering traffic corresponding to a radio access network, which may comprise RAN nodes 105, core network 130, backhaul links 120, and long-range wireless links 125, to user equipment that may be located beyond coverage of a RAN node 105. Links 121 between RAN nodes 105 and satellite base station/gateway 106 may comprise coaxial, fiber, or wireless links that may be similar to links 120. Links 122 to satellite node 107 and links 123 from satellite/node 107 to UE 115 may comprise line-of-sight microwave signal transmission. A UE 115 may be configured with at least one antenna, or at least one processor, to facilitate transmitting or receiving microwave signals to/from satellite node 107. Description of herein, or reference to herein, a radio node or a radio network node may be a description or a reference to either a terrestrial RAN node 105, a non-terrestrial gateway 106, a non-terrestrial satellite node 107, or a combination of one or more of a terrestrial RAN node, a non-terrestrial gateway, or a non-terrestrial satellite. A terrestrial network node may be referred to as a "TN" node. Reference to a satellite node, or a non-terrestrial network node ("NTN node"), may comprise a reference to satellite 107, base station gateway 106, or a combination of satellite 107 and base station/gateway 106.

It will be appreciated that although an NTN node may benefit the most from embodiments disclosed herein, techniques disclosed herein may be of benefit to a ground-based RAN node. Thus, use of "radio network node" may be interpreted as referring to a ground-based RAN node or to a satellite node, which may comprise a gateway 106 or a satellite 107.

NTNs can enhance the limited coverage of ground RANs, which makes NTNs cost efficient in remote rural areas, mountainous areas, and generally where ground cellular deployments are either not possible or not cost efficient.

Incorporating RAN node functionality on board a satellite to facilitate serving user equipment may give rise to performance-related problems, such as, for example, limited transmission power by user equipment in the uplink direction may reduce the ability for the user equipment to establish a high-quality direct uplink radio link towards the satellite node/non-terrestrial node due to distance between the user equipment and the node. Although user equipment equipped with non-terrestrial network transceivers (e.g., non-terrestrial network capable user equipment, or NTN-capable user equipment) can receive non-terrestrial downlink traffic from NTN nodes; lower transmit power corresponding to user equipment with respect to transmitting signals to a non-terrestrial network node can limit delivery of uplink control traffic or uplink data payload traffic from a user equipment to the NTN node resulting in asymmetric NTN link performance.

An NTN-capable user equipment device that experiences a transmission power restriction, for example due to a low battery level or due to being operated close to a human head (e.g., not being operated via a Bluetooth or wired headset), may experience difficulty in establishing and maintaining an NTN uplink link. A NTN-capable user equipment experiencing such degraded ability to communicate with an NTN node via what may be an already asymmetric communication session thus becomes even less able to facilitate acceptable communication performance with respect to the NTN node because communication of necessary uplink control feedback information transmitted from user equipment devices to the NTN node, which control information may be needed for managing and provisioning corresponding NTN downlink traffic flows, becomes more degraded due to the poor uplink link performance. Furthermore, existing conventional uplink coverage enhancement schemes used for ground-based long range wireless communication (e.g., uplink payload repetitions) cannot be directly adopted for NTN uplink links due to the large distance between terrestrially located user equipment devices and an NTN node (e.g., a satellite). Using conventional techniques to effectively extend uplink coverage by approximately tens of meters may result in de minimis improvement at best with respect to uplink performance corresponding to a radio link between a terrestrially located user equipment and a non-terrestrial network node.

Conventional standard radio access classes are associated with a service with respect to which a user equipment device may be establishing a connection with a terrestrial radio access network node (e.g., a voice service) to facilitate the terrestrial RAN node in determining a quality-of-service applicable to traffic associated with, for example, a voice call service. Embodiments disclosed herein may comprise associating an access class with a direction of traffic delivery, wherein an access class may be usable by an NTN-capable user equipment to indicate to a terrestrial radio access network node to establish an uplink-only connection without determining a downlink QoS requirement. One or more access class identifier(s) corresponding to the novel access class(s) may be used to facilitate transparent relaying of NTN uplink traffic and control information, transmitted by a terrestrially located user equipment, via a terrestrial radio access network node instead of the uplink traffic being delivered via an NTN node. (The term 'transparent' may refer to a TN RAN passively relaying NTN uplink traffic based on a determination made by a user equipment or an NTN node instead of the TN RAN node triggering and controlling such relaying.)

Embodiments disclosed herein may facilitate transparent relaying of uplink traffic associated with a communication session between a user equipment and a non-terrestrial network node via terrestrial radio access network node interfaces and radio links. A terrestrial radio access network node may relay uplink traffic from NTN-capable devices without actually processing the traffic. Handling of the uplink traffic being relayed may be considered as dynamically-scheduled blind uplink traffic handling. An NTN-capable user equipment device may trigger and manage NTN uplink traffic relaying via a terrestrial radio access network node interface based on detecting a power restriction with respect to transmitting the uplink traffic to a non-terrestrial network node, for example due to low battery level for instance, or based on determining that uplink traffic delivery performance with respect to the non-terrestrial network node is/may be degraded. A novel terrestrial network access class may be defined and an indication corresponding thereto may be usable by an NTN-capable user equipment to facilitate indicating by the NTN-capable user equipment to a terrestrial RAN node that the terrestrial radio network node is to facilitate uplink-only traffic relaying of uplink traffic, currently being facilitated with respect to the NTN-capable user equipment, by a non-terrestrial network node (e.g., the NTN-capable device may establish an uplink-only connection with the terrestrial RAN node).

Figure 2:
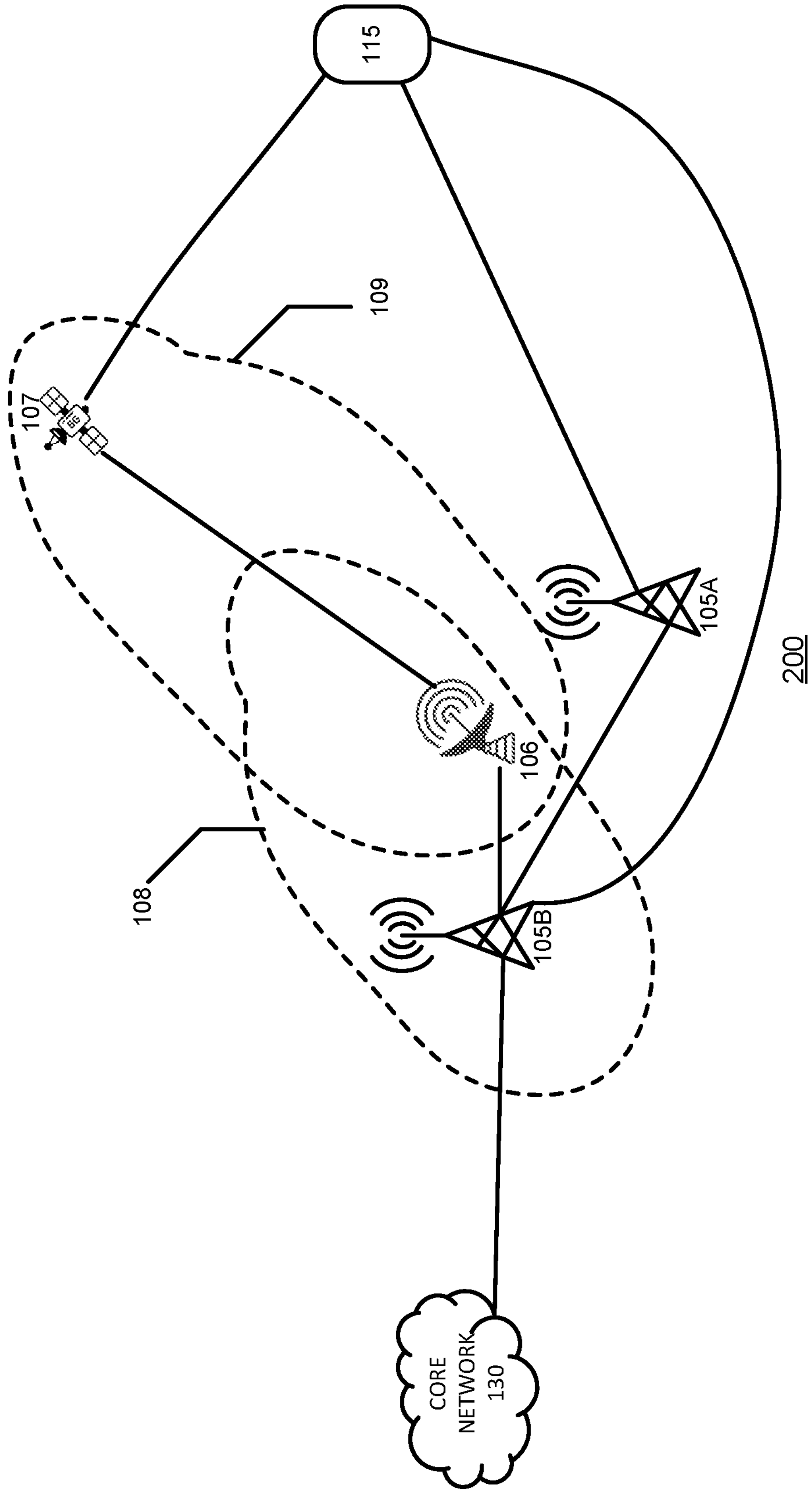
FIG. 2 illustrates an environment with a satellite base station and satellite that are capable of communication of traffic corresponding to a radio access network.

Turning now to FIG. 2, the figure illustrates ground-based RAN node 105A, base station 106, and NTN node 107, any one or more of which may be referred to as a radio network node. In reference to some embodiments disclosed herein, reference to a TN node may comprise a reference to node 108, which may comprise one or more of terrestrial RAN node 105A or gateway 106. In reference to some embodiments disclosed herein, reference to an NTN node may comprise a reference to node 109, which may comprise one or more of gateway 106 or satellite 107. In some embodiments, a communication session with UE 115 may be served by RAN node 105A. In some embodiments, a communication session with UE 115 may be served by RAN node 105B. UE 115 may communicate in an uplink direction via satellite 107 or either of RAN nodes 105A or 105B, either of which may relay uplink NTN traffic corresponding to UE 115.

Transparent Non-Terrestrial Uplink Traffic Relaying.

Figure 3:
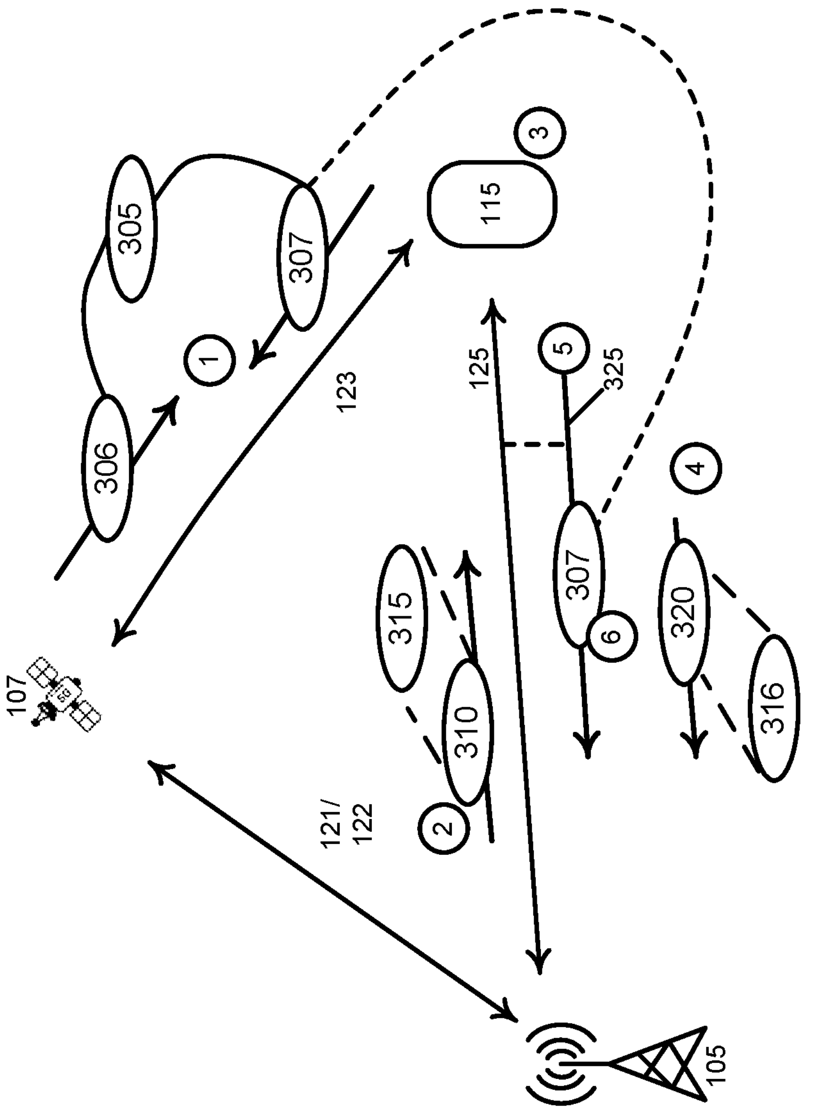
FIG. 3 illustrates an example environment with a non-terrestrial radio network node, facilitating a communication session with a user equipment, determining to relay traffic via a terrestrial radio network node.

As shown in FIG. 3 at act 1, user equipment 115 and satellite/NTN node 107 may establish a communication session 305 (e.g., UE 115 is in a connected mode with respect to satellite 107, which mode may be referred to as the user equipment and satellite being connected or having established a connection). Session 305 may comprise one or more downlink traffic flows 306 and one or more uplink traffic flows 307. At act 2, UE 115 may receive from terrestrial radio network node 105 service class relaying indication message 310 comprising a first service class indication 315 indicative of a service class corresponding to the terrestrial radio network node being configured to facilitate delivery of at least a portion (e.g., at least one uplink traffic flow 307) of non-terrestrial traffic corresponding to communication session 305 established between the user equipment and non-terrestrial network node 107. Message 310 may be received via a system information block message broadcast by terrestrial radio access network node 105.

At act 3, UE 115 may determine that delivery of at least a portion (e.g., at least one uplink traffic flow 307) of non-terrestrial traffic 305 is to be facilitated by terrestrial radio network node 105. User equipment 115 may base the determination made at act 3 on a battery charge level that may have dropped below a batter charge criterion, wherein the low battery charge level may result in reduced transmit output power by the user equipment when transmitting uplink traffic to non-terrestrial network node 107 as compared to transmit output power when the battery charge level is not low with respect to the battery charge criterion. User equipment 115 may base the determination made at act 3 on sensing that the user equipment is in close proximity to a human head, thus causing the user equipment to limit transmit power with respect to transmitting uplink traffic 307 to NTN node 107. At act 4, user equipment 115 may transmit to RAN node 105 connection establishment request message 320 comprising a second service class indication 316 indicative of a service class indicated by indication 315 receive from the RAN node via message 310. Based on the transmitting of connection establishment request message 320, user equipment 115 and RAN node 105 may establish, at act 5, connection 325, via one or more terrestrial radio links 125, to result in an established connection. At act 6, user equipment may avoid transmitting at least one uplink traffic flow 307 to satellite/NTN node 107 via link(s) 123 and offload uplink delivery of the uplink traffic flow onto terrestrial RAN node 105 via established connection 325. Accordingly, user equipment 115 may determine that either channel conditions corresponding to communication link 123 or transmit power output corresponding to user equipment 115 do not facilitate uplink delivery of at least one uplink traffic flow 107 according to a quality-of-service that may be associated with the at least one uplink traffic flow 107, and the user equipment may determine to offload delivery of uplink traffic from being facilitated by NTN node 107 to being facilitated by terrestrial RAN node 105.

Figure 4:
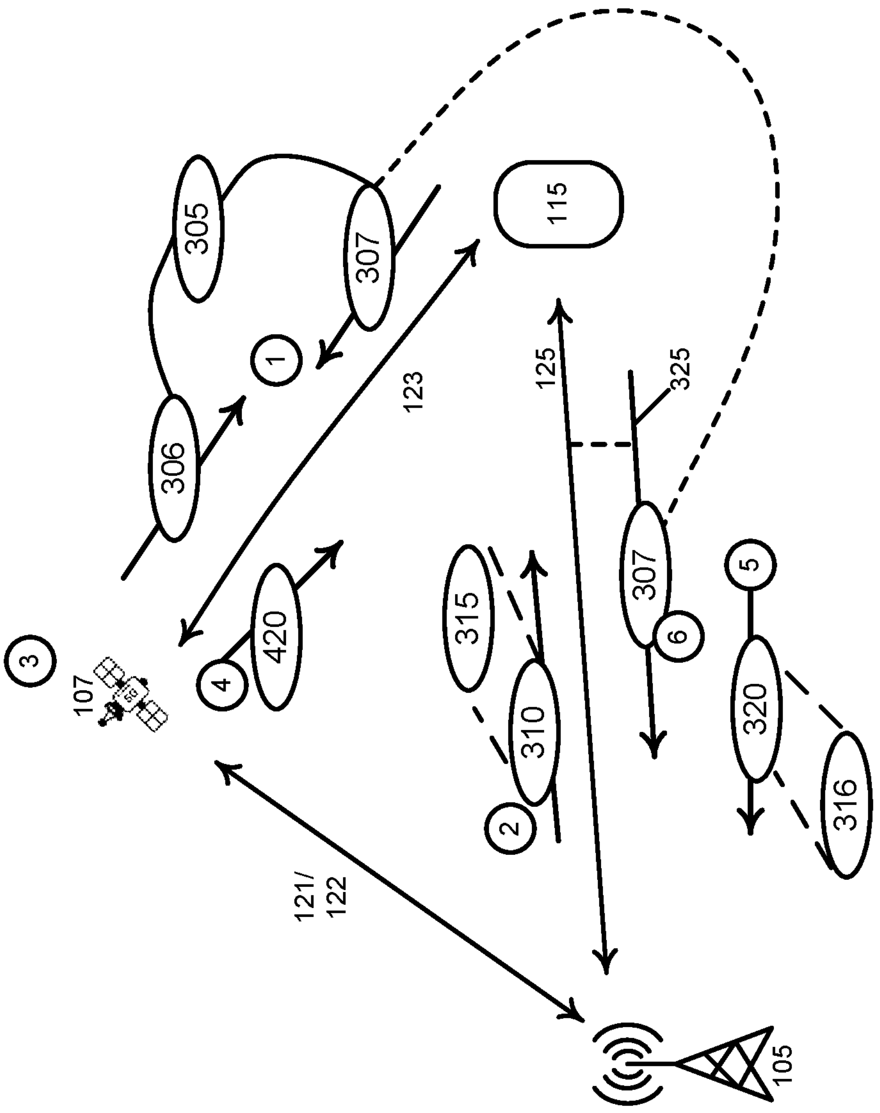
FIG. 4 illustrates an example environment with a user equipment, facilitating a communication session with a non-terrestrial radio network node, determining to relay traffic via a terrestrial radio network node.

In another embodiment, as shown in FIG. 4, following acts 1 and 2 described in reference to FIG. 3, NTN RAN node 107 may determine at act 3 that an NTN uplink received coverage, (e.g., a signal strength corresponding to a signal received from UE 115 at active NTN RAN node 107) is lower than a predefined/configured criterion threshold or that a received uplink block error rate corresponding to at least one uplink traffic flow 307 exceeds a predefined threshold/criterion. Based on the determination made at act 3, at act 4, NTN node 107 may transmit to UE 115, and the UE may receive, traffic-relaying indication 420 indicative that the user equipment is to offload delivery of at least one non-terrestrial uplink traffic flow 307 to terrestrial radio network node 105. At act 5, user equipment 115 may transmit to RAN node 105 connection establishment request message 320 comprising second service class indication 316 indicative of a service class indicated by indication 315 received from the RAN node via message 310. Based on the transmitting of connection establishment request message 320, user equipment 115 and RAN node 105 may establish at act 5 connection 325, via one or more terrestrial radio links 125, to result in an established connection. At act 6, user equipment may avoid transmitting at least one uplink traffic flow 307 to satellite/NTN node 107 via link(s) 123 and offload uplink delivery of the at least one uplink traffic flow to terrestrial RAN node 105 via established connection 325. Accordingly, NTN node 107 may determine that either channel conditions corresponding to communication link 123 (which may result in block error rate that exceeds a configured criterion as may be determined at act 3) or that transmit power output corresponding to user equipment 115 does not facilitate uplink delivery of at least one uplink traffic flow 107 according to a quality-of-service that may be associated with the at least one uplink traffic flow 107, and thus may determine to offload delivery of uplink traffic from being facilitated by the NTN node to being facilitated by terrestrial RAN node 105.

Re-routing and transmitting of NTN uplink traffic 107 toward TN RAN node 105 at act 6 (as shown in either FIG. 3 or FIG. 4) may be facilitated according to conventional dynamically scheduled, or pre-configured, uplink traffic delivery resource grants. UE 115 may transmit uplink control information corresponding to NTN downlink traffic 306, or control information associated therewith, either towards the TN RAN node 105 or directly towards the NTN RAN node 107.

Figure 5:
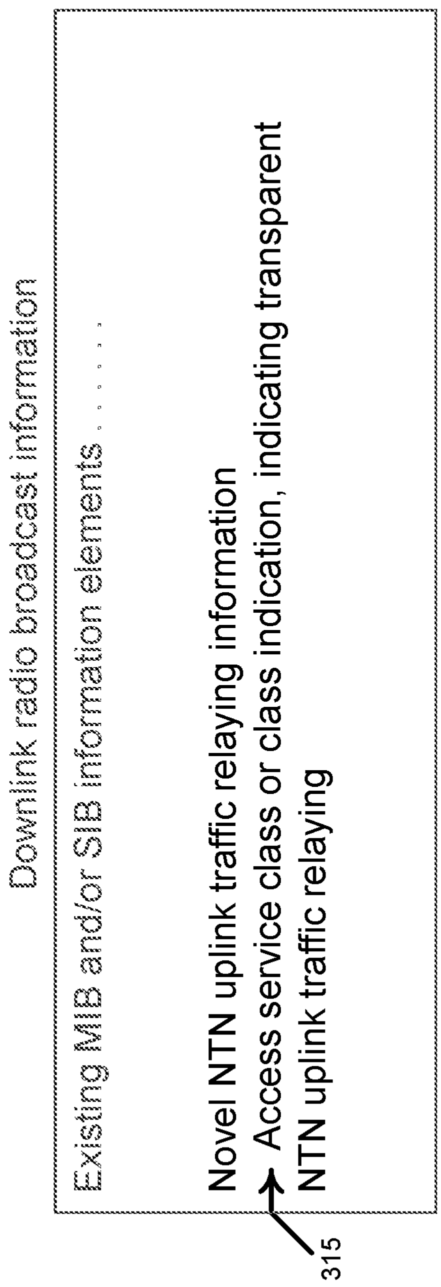
FIG. 5 illustrates an example service-class-relaying system information block.

Non-terrestrial network capable WTRU/device 115 may receive and decode terrestrial network downlink broadcast information 310 as part of a system information block message that may comprise a new access service class and/or service class indication 315 (shown in FIG. 5), indicative of transparent NTN uplink traffic relaying. Use by NTN-capable user equipment 115 of indication 315 to indicate to terrestrial RAN node 105 that uplink traffic corresponding to traffic flow 305 is to be offloaded to the terrestrial RAN node may facilitate the user equipment being able to facilitate transparent relaying of NTN uplink traffic and NTN uplink control information via a TN interface and radio links 125 without involvement of the TN RAN (e.g., the UE or NTN node may determine that offloading is desired and the TN RAN node may merely schedule resources to facilitate delivery of the uplink traffic in response to receiving message 320).

Figure 6:
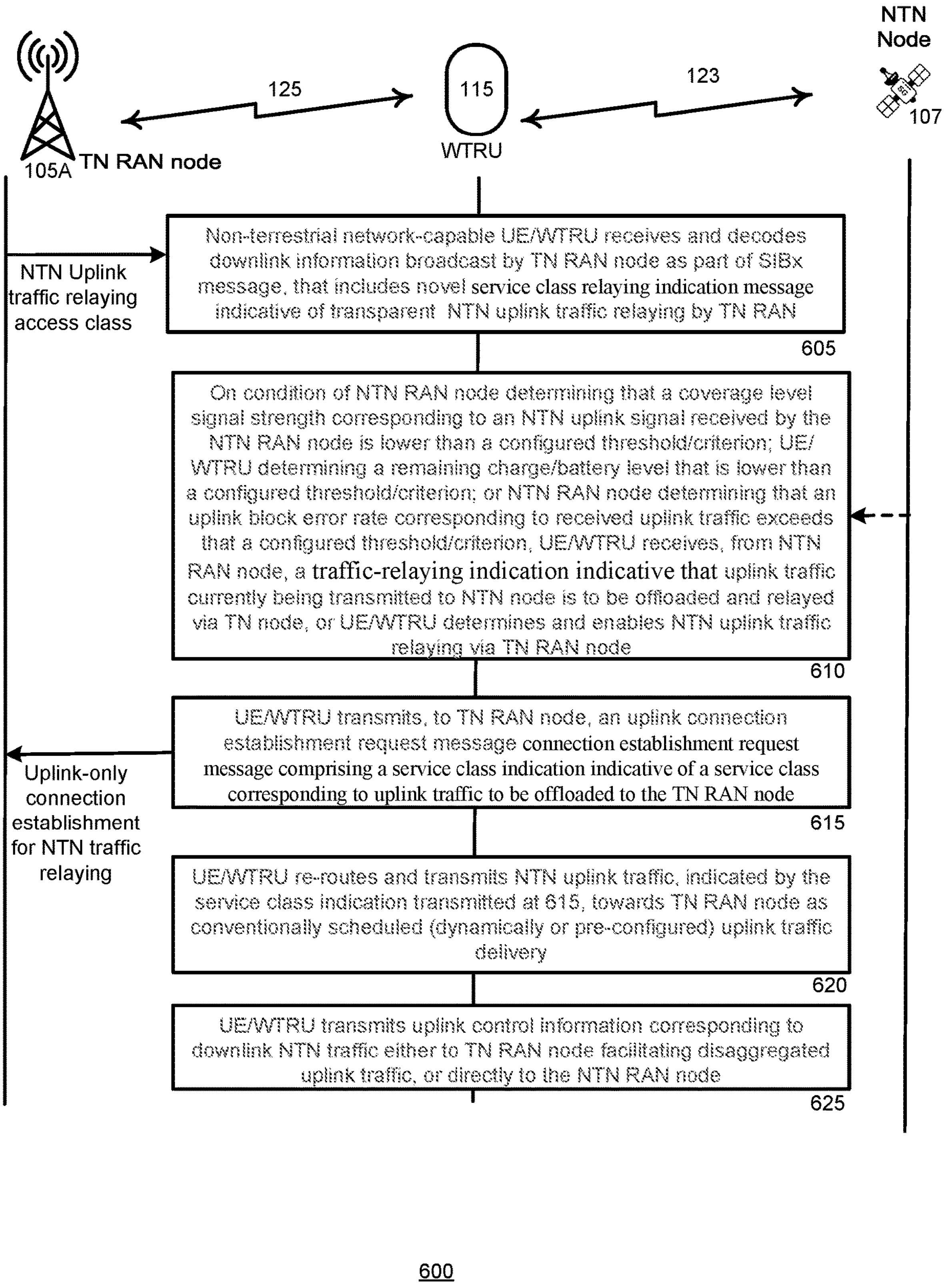
FIG. 6 illustrates a timing diagram of an example embodiment of a user equipment transferring non-terrestrial network node communication session traffic to be relayed by a terrestrial network node.

Turning now to FIG. 6, the figure illustrates a timing diagram of an example embodiment method 600. At act 605, non-terrestrial network-capable UE/WTRU 115 may receive and decode terrestrial network information broadcast as part of a SIB message, which may comprise a service class relaying indication message indicative of transparent NTN uplink traffic relaying by TN RAN being enabled. On condition of NTN RAN node 107 determining a received NTN uplink received coverage level/signal strength that is lower at the NTN node than a predefined/configured threshold/criterion, on condition of UE/WTRU 115 determining a remaining battery level that is lower than a predefined/configured threshold criterion (which may result in an uplink transmission power restriction being applied at the UE), or on condition of NTN node 107 determining a received trailing uplink block error rate ("BLER") that is larger than a predefined/configured threshold/criterion, at act 610 the U E/WTRU may receive, from NTN RAN node 107, a traffic relaying indication indicative of relaying of uplink traffic, corresponding to a traffic session being facilitated by NTN node 107, being offloaded for delivery via TN RAN node 105. In an embodiment, at act 610, instead of receiving a traffic relaying indication from NTN node 107, UE/WTRU 115 may determine that uplink traffic being facilitated by NTN node 107 may be offloaded to TN RAN node 105 for facilitation of delivery thereby. Regardless of whether UE/WTRU 115 receives a traffic relaying indication from NTN node 107 or the UE/WTRU determines to offload uplink traffic to TN RAN node 105, the UE/WTRU may transmit at act 615 an uplink connection establishment request, towards currently selected TN RAN node 105, comprising a service class indication indicative of a service class corresponding to uplink traffic to be offloaded to the TN RAN node. At act 620, UE/WTRU may avoid further transmission of uplink traffic corresponding to the service class indicated in the connection establishment request transmitted at act 615 and re-route and transmit the indicated NTN uplink traffic toward TN RAN node 105. Uplink traffic rerouted for relaying via TN RAN node 105 may be scheduled, by TN RAN node 105, for delivery according to conventional uplink scheduling techniques, (e.g., dynamic or pre-configured techniques). At act 625, UE/WTRU 115 may transmit uplink control information corresponding to NTN downlink traffic, or control information associated therewith, either towards TN RAN node 105 or directly toward NTN RAN node to which the traffic is directed.

Figure 7:
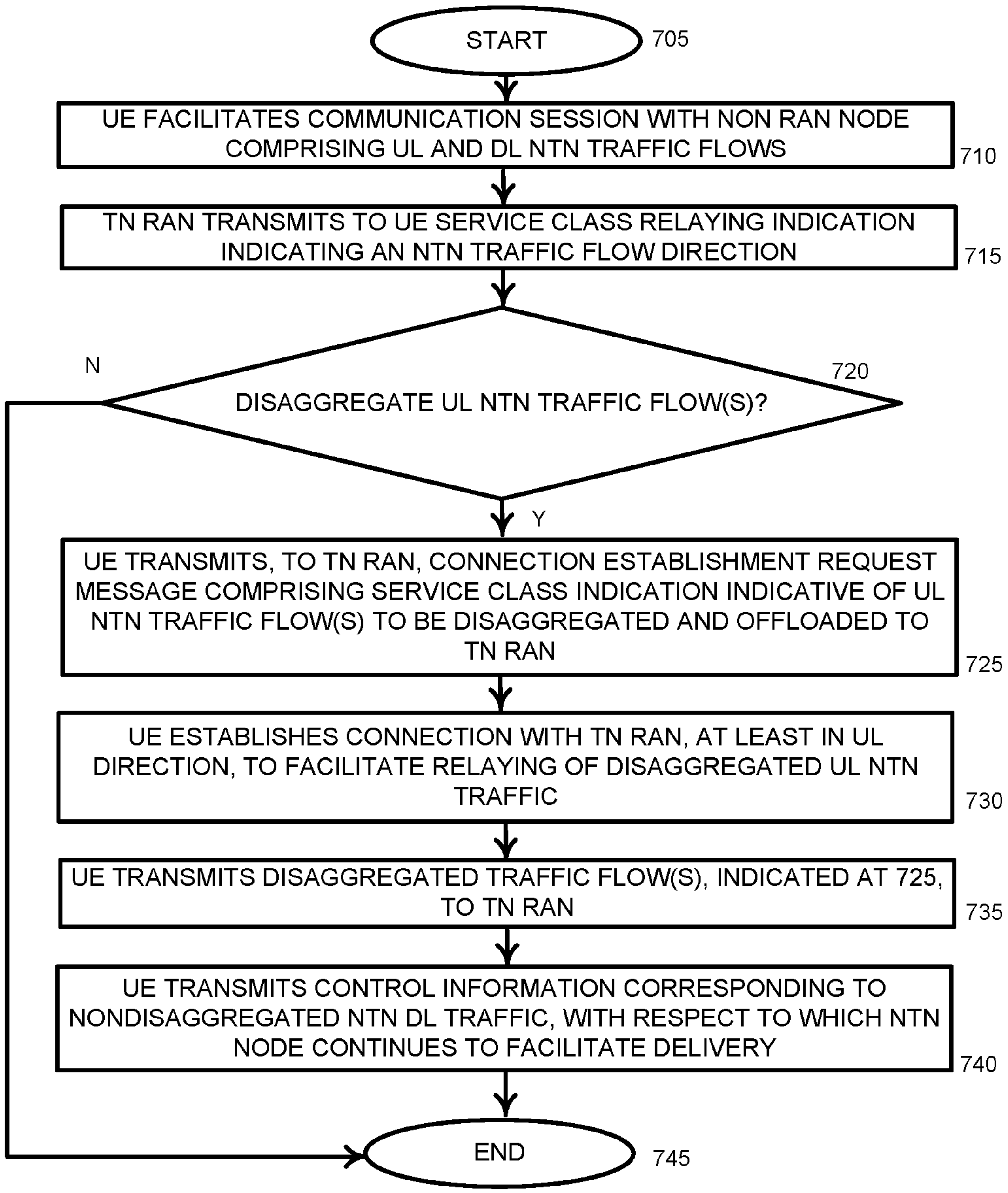
FIG. 7 illustrates a flow diagram of an example embodiment method.

Turning now to FIG. 7, the figure illustrates a flow diagram of an example embodiment 700. Method 700 begins at act 705. At act 710, a non-terrestrial communication session may be established, or may have been established, between a user equipment 115 and a non-terrestrial radio network node 107. At act 715, the user equipment may receive a service class relaying indication message, such as message 310 described in reference to FIG. 3, transmitted by a terrestrial radio access network node 105, that may indicate a service class corresponding to the communication session established at act 710. A service class indicated by the service class indication message may be indicative of non-terrestrial network traffic flowing, or being delivered, in a specific direction, for example an uplink direction. The service class relaying indication message may be a system information block message that may be specified to deliver a directional traffic flow service class indication. At act 720, the user equipment may determine whether to disaggregate, or initiate disaggregation of, a traffic flow corresponding to the communication session established at act 710. For example, the user equipment may determine to disaggregate uplink traffic, corresponding to the communication session established at act 710, from downlink traffic corresponding to the communication session, so that the uplink traffic may be transmitted to a terrestrial radio access network node instead of being transmitted to the non-terrestrial radio network node that has been facilitating delivery of uplink traffic corresponding to the communication session established. If the user equipment determines at act 720 not to disaggregate traffic corresponding to a traffic flow direction specified in the service class relaying indication message received at act 715, method 700 may advance to act 745 and end.

In an embodiment, the determining, at act 720, that delivery of disaggregated non-terrestrial uplink traffic flow is to be facilitated by the terrestrial radio network node may comprise receiving, by the user equipment from the non-terrestrial network node, a traffic-relaying indication, such as indication 420 described in reference to FIG. 4, indicative that the user equipment is to offload the delivery of non-terrestrial uplink traffic flow to the terrestrial radio network node. The non-terrestrial network node may determine that a portion of the communication session established at act 710 (e.g., one or more uplink traffic flow(s)) is to be offloaded for delivery/relaying by the terrestrial radio access network node based on determining that a signal strength corresponding to the user equipment does not exceed a strength value/criterion specified by a configured uplink transmission signal strength criterion. For example, if the non-terrestrial network node determines that a signal strength corresponding to a signal transmitted by the user equipment to the non-terrestrial network node is lower, or weaker, than a configured uplink transmission signal strength criterion corresponding to the user equipment, corresponding to a quality-of-service corresponding to the communication session established at act 710, or corresponding to another characteristic or parameter, the non-terrestrial network node may determine to transmit a traffic-relaying indication to the user equipment. Accordingly, for example, based on receiving a traffic-relaying indication from the non-terrestrial network node and based on a service class relaying indication received from the terrestrial radio access network node at act 715 that indicates that the terrestrial radio access network node has been configured to, or enabled to, facilitate relaying non-terrestrial uplink traffic on behalf of the non-terrestrial network node, the user equipment may determine, at act 720, to disaggregate uplink traffic corresponding to the non-terrestrial communication session established at act 710 from being transmitted to the non-terrestrial network node to instead being transmitted to the terrestrial radio access network node for relaying thereby.

In an embodiment, the determining, at act 720, that delivery of disaggregated non-terrestrial uplink traffic flow is to be facilitated by the terrestrial radio network node may comprise the user equipment receiving from the non-terrestrial network node a traffic-relaying indication transmitted by the non-terrestrial network node based on a determination, by the non-terrestrial network node, that an uplink error rate corresponding to uplink traffic received by the non-terrestrial network node from the user equipment is not less than an error rate value specified by an uplink error rate criterion. The uplink error rate criterion may be based on, or may correspond to, the user equipment, a quality-of-service corresponding to the communication session established at act 710, or another characteristic or parameter. Accordingly, for example, if the non-terrestrial network node determines that an error rate corresponding to one or more non-terrestrial uplink traffic flows corresponding to the communications session established at act 810 exceeds a configured uplink error rate criterion, the non-terrestrial network node may transmit to the user equipment the traffic relaying indication indicative to the user equipment to determine to disaggregate the one or more non terrestrial uplink traffic flows from downlink traffic corresponding to the communication session established at act 710 and indicative to transmit the one or more non terrestrial uplink traffic flows to the terrestrial radio access network node instead of to the non-terrestrial network node. Traffic corresponding to the one or more non-terrestrial uplink traffic flows determined at act 720 to be disaggregated from downlink traffic and to be transmitted to the terrestrial radio access network node instead of being transmitted to the non-terrestrial network node may correspond to the error rate determined by the non-terrestrial network node or may be traffic corresponding to other non-terrestrial uplink traffic flows corresponding to the communication session established at act 710.

In an embodiment, the determining, at act 720, that delivery of disaggregated non-terrestrial uplink traffic is to be facilitated by the terrestrial radio access network node may comprise determining, by the user equipment, that a battery charge value corresponding to the user equipment (e.g., a charge state of a battery that supplies power to the user equipment) does not exceed a value defined by a configured battery charge criterion. The determining, at act 720, that delivery of disaggregated non terrestrial uplink traffic is to be facilitated by the terrestrial radio access network node may comprise determining, by the user equipment, that an uplink transmission power corresponding to transmission of uplink traffic (terrestrial or non-terrestrial) is to be not greater than a transmission power specified by a configured uplink traffic transmission power criterion. The user equipment may determine that the uplink transmission power is not to exceed the transmission power criterion based on a battery charge corresponding to a battery that supplies power to the user equipment or based on a location of the user equipment, for example the user equipment being within a specified or configured range of a human head.

If a determination is made at act 720 that a portion of traffic, for example traffic corresponding to an uplink traffic flow, is to be disaggregated from traffic, for example downlink traffic, being facilitated by a non-terrestrial network node and is to be directed to a terrestrial radio network node, method 700 may advance to act 725. At act 725, the user equipment may transmit to the terrestrial radio access network node a connection establishment request, for example request 320 shown in FIG. 3 and described in reference thereto. The connection establishment request may comprise a service class indication indicative that the user equipment is requesting establishment of a connection with respect to the terrestrial radio access network node for purposes of relaying non-terrestrial uplink traffic that has been disaggregated from associated downlink traffic. Thus, the user equipment may establish a connection with the terrestrial radio access network node that may be a conventional connection insofar as the user equipment may transmit uplink traffic to the terrestrial radio access network node and the user equipment may receive downlink traffic from the terrestrial radio access network node. In an embodiment, the service class indicator indicated in the connection establishment request transmitted at act 725 may request establishment of a connection with the terrestrial radio access network node only for the purpose of relaying disaggregated non-terrestrial uplink traffic via the terrestrial radio access network node. Accordingly, although the user equipment may be in a connected state, or operating in a connected mode, with respect to the non-terrestrial network node, the user equipment may have been operating in an idle mode with respect to the terrestrial radio access network node and thus the connection establishment request transmitted at act 725 may facilitate the user equipment continuing to operate in a connected mode with respect to the non-terrestrial network node and also operating in a connected mode with respect to the terrestrial radio access network node, at least in a direction corresponding to the service class indicated in the connection establishment request transmitted at act 725.

At act 730, the user equipment may establish a connection with the terrestrial radio access network node according to the connection establishment request transmitted at act 725 and a service class indicator indicated thereby. At act 735, the user equipment may transmit disaggregated traffic, for example disaggregated non-terrestrial uplink traffic, as indicated by a connection establishment request transmitted at act 725. At act 740, the user equipment may transmit control information corresponding to non-terrestrial traffic that was not disaggregated, which may be downlink traffic or which may be uplink traffic. In an embodiment, control information transmitted at act 740 may be transmitted to the terrestrial radio access network node for relaying or forwarding toward the non-terrestrial network node. In an embodiment, control information transmitted at act 740 may be transmitted directly to the non-terrestrial network node. Method 700 advances to act 745 and ends.

Figure 8:
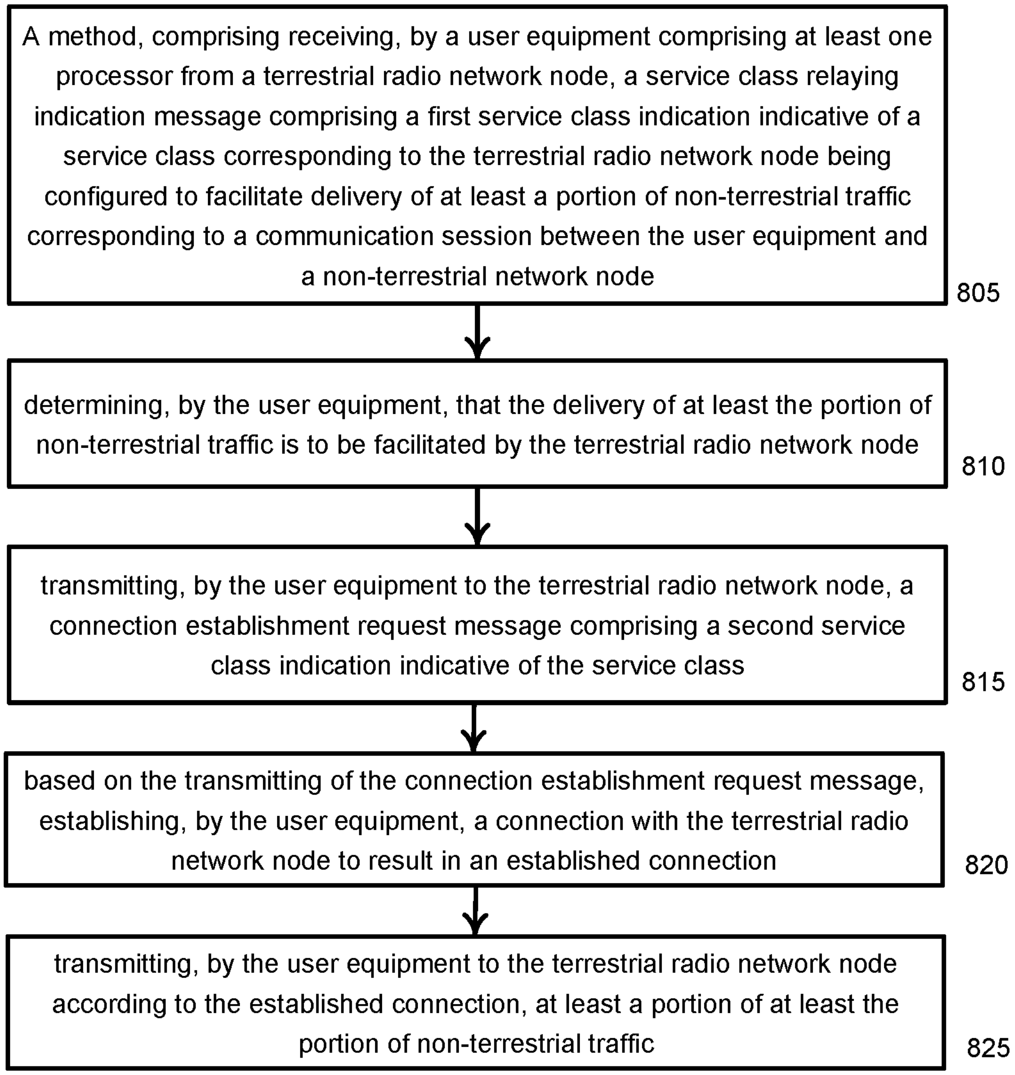
FIG. 8 illustrates a block diagram of an example method embodiment.

Turning now to FIG. 8, the figure illustrates an example embodiment method 800 comprising at block 805 receiving, by a user equipment comprising at least one processor, from a terrestrial radio network node, a service class relaying indication message comprising a first service class indication indicative of a service class corresponding to the terrestrial radio network node being configured to facilitate delivery of at least a portion of non-terrestrial traffic corresponding to a communication session between the user equipment and a non-terrestrial network node; at block 810 determining, by the user equipment, that the delivery of at least the portion of non-terrestrial traffic is to be facilitated by the terrestrial radio network node; at block 815 transmitting, by the user equipment to the terrestrial radio network node, a connection establishment request message comprising a second service class indication indicative of the service class; at block 820 based on the transmitting of the connection establishment request message, establishing, by the user equipment, a connection with the terrestrial radio network node to result in an established connection; and at block 825 transmitting, by the user equipment to the terrestrial radio network node according to the established connection, at least a portion of at least the portion of non-terrestrial traffic.

Figure 9:
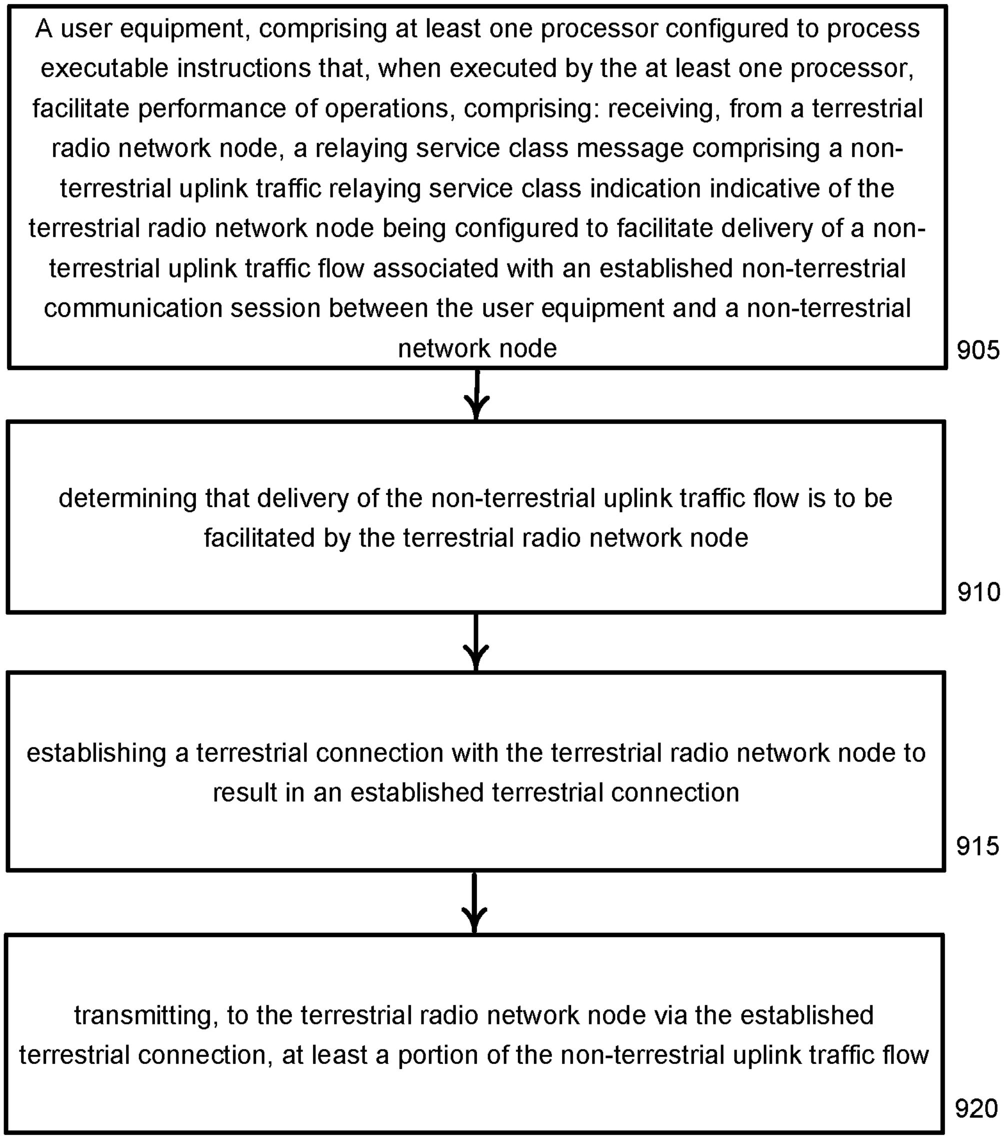
FIG. 9 illustrates a block diagram of an example user equipment.

Turning now to FIG. 9, the figure illustrates an example user equipment 900, comprising at block 905 at least one processor configured to process executable instructions that, when executed by the at least one processor, facilitate performance of operations, comprising receiving, from a terrestrial radio network node, a relaying service class message comprising a non-terrestrial uplink traffic relaying service class indication indicative of the terrestrial radio network node being configured to facilitate delivery of a non-terrestrial uplink traffic flow associated with an established non-terrestrial communication session between the user equipment and a non-terrestrial network node; at block 910 determining that delivery of the non-terrestrial uplink traffic flow is to be facilitated by the terrestrial radio network node; at block 915 establishing a terrestrial connection with the terrestrial radio network node to result in an established terrestrial connection; and at block 920 transmitting, to the terrestrial radio network node via the established terrestrial connection, at least a portion of the non-terrestrial uplink traffic flow.

Figure 10:
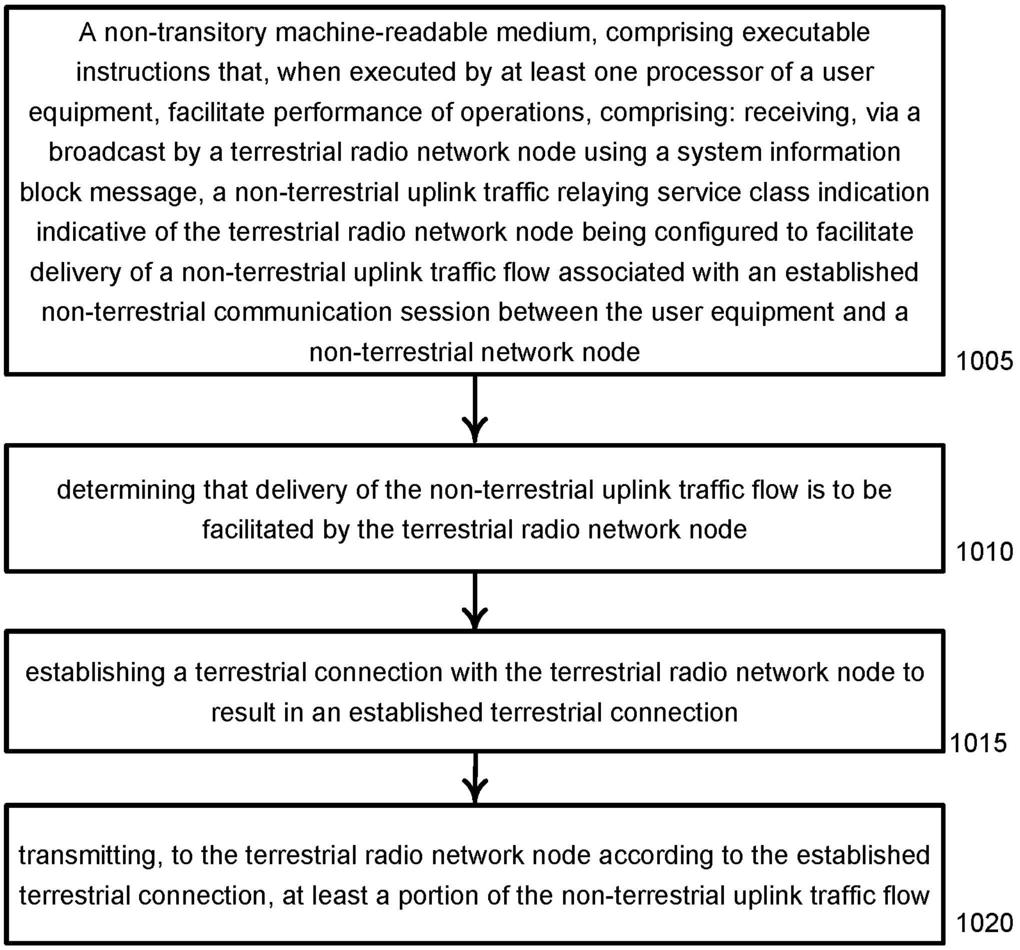
FIG. 10 illustrates a block diagram of an example non-transitory machine-readable medium embodiment.

Turning now to FIG. 10, the figure illustrates a non-transitory machine-readable medium 1000 comprising at block 1005 executable instructions that, when executed by at least one processor of a user equipment, facilitate performance of operations, comprising receiving, via a broadcast by a terrestrial radio network node using a system information block message, a non-terrestrial uplink traffic relaying service class indication indicative of the terrestrial radio network node being configured to facilitate delivery of a non-terrestrial uplink traffic flow associated with an established non-terrestrial communication session between the user equipment and a non-terrestrial network node; at block 1010 determining that delivery of the non-terrestrial uplink traffic flow is to be facilitated by the terrestrial radio network node; at block 1015 establishing a terrestrial connection with the terrestrial radio network node to result in an established terrestrial connection; and at block 1020 transmitting, to the terrestrial radio network node according to the established terrestrial connection, at least a portion of the non-terrestrial uplink traffic flow.

Figure 11:
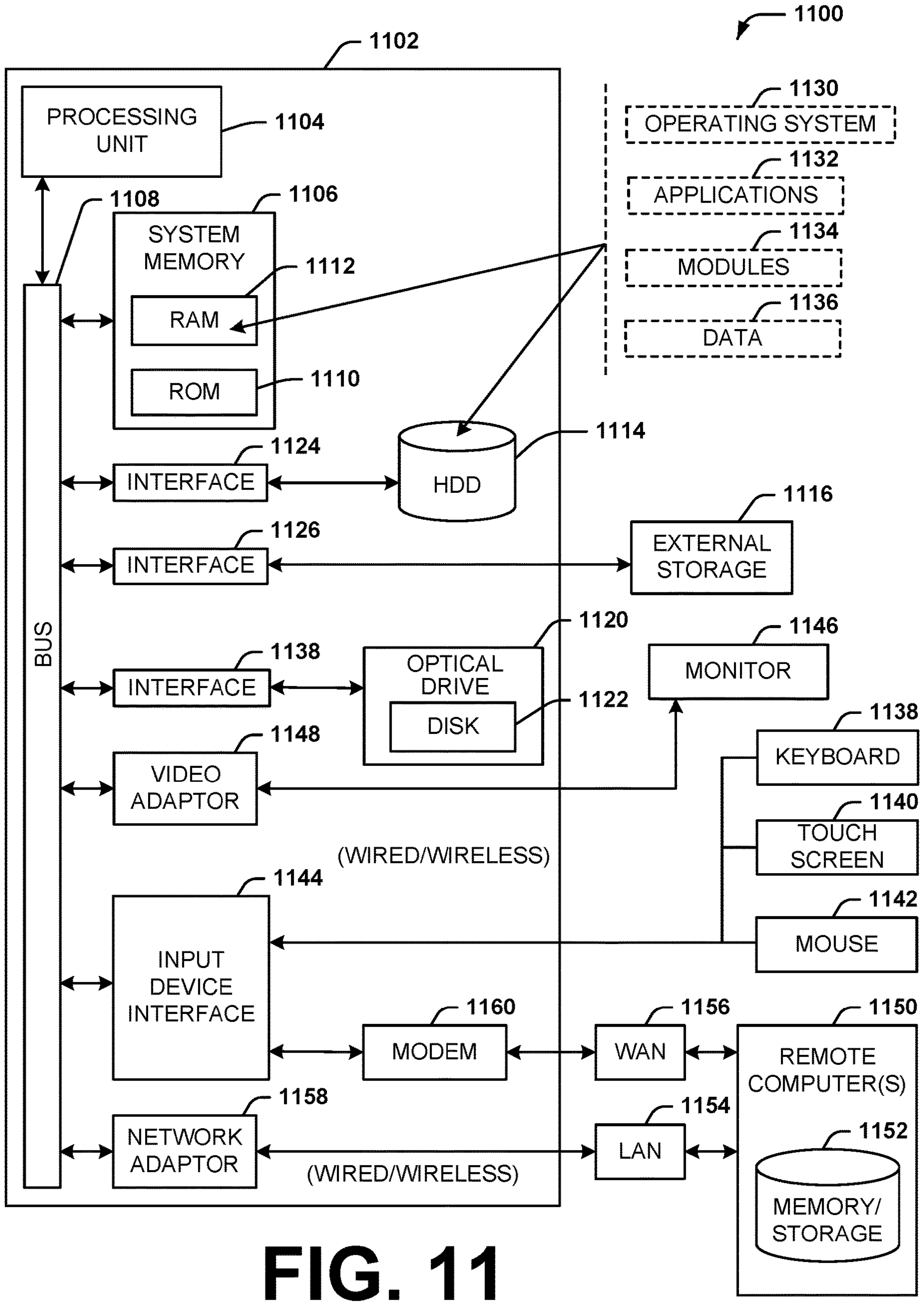
FIG. 11 illustrates an example computer environment.

In order to provide additional context for various embodiments described herein, FIG. 11 and the following discussion are intended to provide a brief, general description of a suitable computing environment 1100 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

Computer 1102 further includes an internal hard disk drive (HDD) 1114 (e.g., EIDE, SATA), one or more external storage devices 1116 (e.g., a magnetic floppy disk drive (FDD), a memory stick or flash drive reader, a memory card reader, etc.) and an optical disk drive 1120 (e.g., which can read or write from disk 1122, for example a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
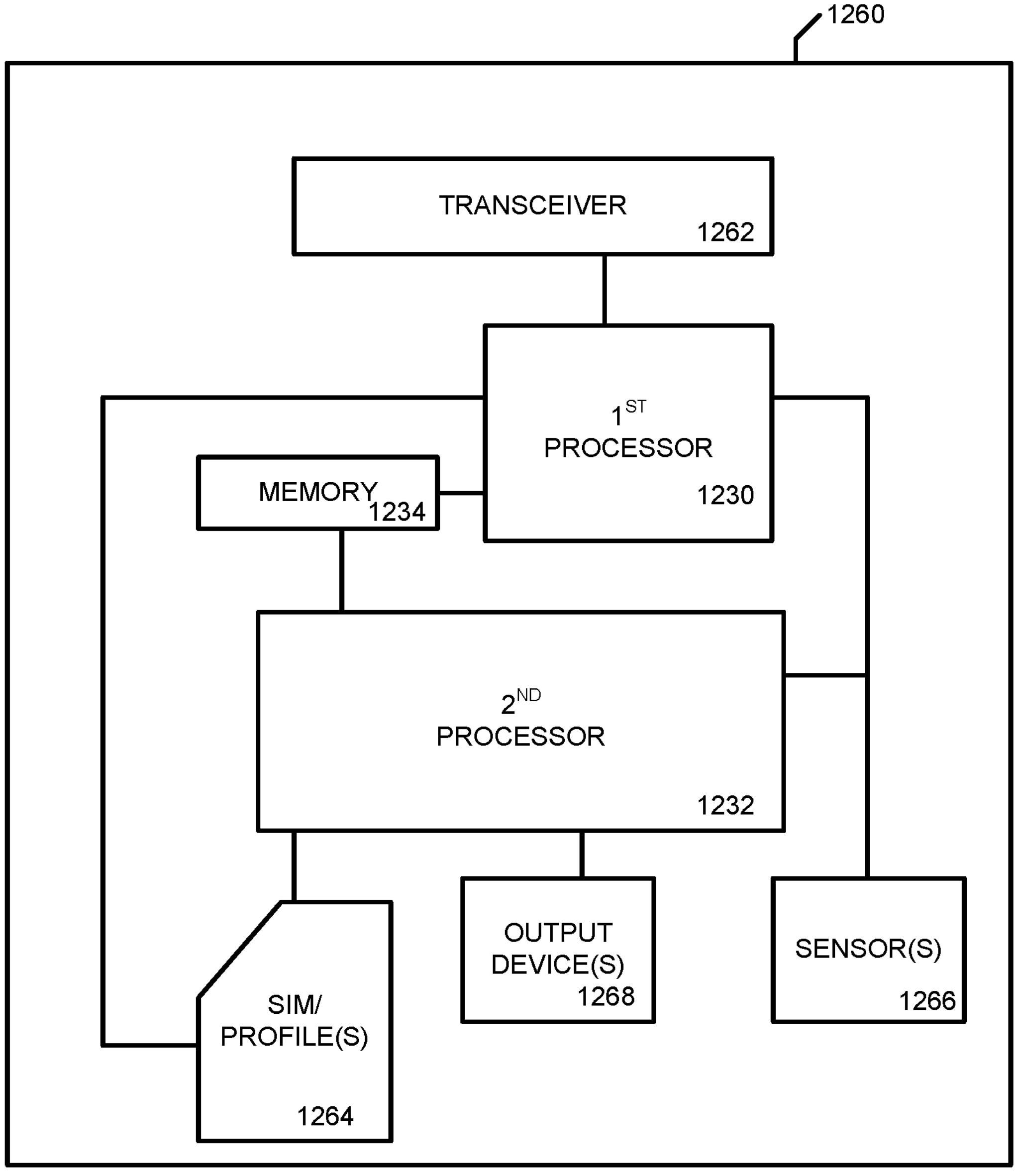
FIG. 12 illustrates a block diagram of an example wireless user equipment.

Turning now to FIG. 12, the figure illustrates a block diagram of an example UE 1260. UE 1260 may comprise a smart phone, a wireless tablet, a laptop computer with wireless capability, a wearable device, a machine device that may facilitate vehicle telematics, an intermediate XR processing unit, and the like. UE 1260 may comprise a first processor 1230, a second processor 1232, and a shared memory 1234. UE 1260 may include radio front end circuitry 1262, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1262 may comprise multiple sets of circuitry or may be tunable to accommodate different frequency ranges, different modulations schemes, or different communication protocols, to facilitate long-range wireless links such as links 125, device-to-device links, such as links 135, and short-range wireless links, such as links 137.

Continuing with description of FIG. 12, UE 1260 may also include a SIM 1264, or a SIM profile, which may comprise information stored in a memory (memory 1234 or a separate memory portion), for facilitating wireless communication with RAN 105 or core network 130 shown in FIG. 1. FIG. 12 shows SIM 1264 as a single component in the shape of a conventional SIM card, but it will be appreciated that SIM 1264 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1264 and another device, which may be a component of RAN 105, node 107, or core network 130 shown in FIG. 1). A SIM profile 1264 may also comprise identifying information that is unique to the SIM, or SIM profile, such as, for example, an International Mobile Subscriber Identity ("IMSI") or information that may make up an IMSI.

SIM 1264 is shown coupled to both first processor portion 1230 and second processor portion 1232. Such an implementation may provide an advantage that first processor portion 1230 may not need to request or receive information or data from SIM 1264 that second processor 1232 may request, thus eliminating the use of the first processor acting as a 'go-between' when the second processor uses information from the SIM in performing its functions and in executing applications. First processor 1230, which may be a modem processor or baseband processor, is shown smaller than processor second 1232, which may be a more sophisticated application processor than the first processor, to visually indicate the relative levels of sophistication (i.e., processing capability and performance) and corresponding relative levels of operating power consumption levels between the two processor portions. Keeping the second processor portion 1232 asleep/inactive/in a low power state when UE 1260 does not need the second processor for executing applications and processing data related to an application provides an advantage of reducing power consumption when the UE only needs to use the first processor portion 1230 while in listening mode for monitoring routine configured bearer management and mobility management/maintenance procedures, or for monitoring search spaces that the UE has been configured to monitor while the second processor portion remains inactive/asleep.

UE 1260 may also include sensors 1266, such as, for example, temperature sensors, accelerometers, gyroscopes, barometers, moisture sensors, light sensors, and the like that may provide signals to the first processor 1230 or second processor 1232. Output devices 1268 may comprise, for example, one or more visual displays (e.g., computer monitors, VR appliances, and the like), acoustic transducers, such as speakers or microphones, vibration components, and the like. Output devices 1268 may comprise software that interfaces with output devices, for example, visual displays, speakers, microphones, touch sensation devices, smell or taste devices, and the like, that are external to UL 1260.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |

TABLE 1-continued

| Term | Definition |
|---|---|
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| BWP | Bandwidth Part |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by a user equipment comprising at least one processor from a terrestrial radio network node, a service class relaying indication message comprising a first service class indication indicative of a service class corresponding to the terrestrial radio network node being configured to facilitate delivery of at least a portion of non-terrestrial traffic corresponding to a communication session between the user equipment and a non-terrestrial network node;

determining, by the user equipment, that the delivery of at least the portion of non-terrestrial traffic is to be facilitated by the terrestrial radio network node;

transmitting, by the user equipment to the terrestrial radio network node, a connection establishment request message comprising a second service class indication indicative of the service class;

based on the transmitting of the connection establishment request message, establishing, by the user equipment, a connection with the terrestrial radio network node to result in an established connection; and transmitting, by the user equipment to the terrestrial radio network node according to the established connection, at least a portion of at least the portion of non-terrestrial traffic, wherein at least the portion of at least the portion of non-terrestrial traffic comprises uplink traffic corresponding to the communication session, wherein delivery of at least the portion of at least the portion of non-terrestrial traffic is facilitated by the terrestrial radio network node, and wherein delivery of downlink traffic corresponding to the communication session is facilitated by the non-terrestrial network node.

2. The method of claim 1, wherein the connection establishment request message further comprises a non-terrestrial network node identifier corresponding to the non-terrestrial network node.

3. The method of claim 1, wherein the determining that the delivery of at least the portion of non-terrestrial traffic is to be facilitated by the terrestrial radio network node comprises:

receiving, from the non-terrestrial network node, a traffic-relaying indication indicative that the user equipment is to offload the delivery of at least the portion of non-terrestrial traffic to the terrestrial radio network node.

4. The method of claim 3, wherein the traffic-relaying indication is transmitted by the non-terrestrial network node based on a determination, by the non-terrestrial network node, that a signal strength corresponding to the user equipment is not greater than a strength value specified by a configured uplink transmission signal strength criterion.

5. The method of claim 3, wherein the traffic-relaying indication is transmitted by the non-terrestrial network node based on a determination, by the non-terrestrial network node, that an uplink error rate corresponding to uplink traffic received by the non-terrestrial network node from the user equipment is not less than an error rate value specified by an uplink error rate criterion.

6. The method of claim 1, wherein the determining that the delivery of at least the portion of non-terrestrial traffic is to be facilitated by the terrestrial radio network node comprises:

determining that a battery charge value corresponding to the user equipment is not greater than a battery charge threshold specified by a configured battery charge criterion.

7. The method of claim 1, wherein the determining that the delivery of at least the portion of non-terrestrial traffic is to be facilitated by the terrestrial radio network node comprises:

determining that an uplink transmission power corresponding to transmission of uplink traffic is to be not greater than a transmission power specified by a configured uplink traffic transmission power criterion.

8. The method of claim 1, further comprising:

transmitting, by the user equipment to the terrestrial radio network node, non-terrestrial control information corresponding to non-terrestrial downlink traffic associated with the communication session between the user equipment and a non-terrestrial network node.

9. The method of claim 1, further comprising:

transmitting, by the user equipment to the terrestrial radio network node, non-terrestrial control information corresponding to non-terrestrial downlink traffic control information associated with the communication session between the user equipment and a non-terrestrial network node.

10. The method of claim 1, wherein the service class relaying indication message is broadcast by the terrestrial radio network node in a system information block message.

11. The method of claim 1, wherein the user equipment operates in an idle mode with respect to the terrestrial radio network node before the established connection is established.

12. The method of claim 1, wherein at least the portion of at least the portion of non-terrestrial traffic is relayed by the terrestrial radio access network node to the non-terrestrial network node without processing at least the portion of at least the portion of non-terrestrial traffic.

13. A user equipment, comprising:

at least one processor configured to process executable instructions that, when executed by the at least one processor, facilitate performance of operations, comprising:

receiving, from a terrestrial radio network node, a relaying service class message comprising a non-terrestrial uplink traffic relaying service class indication indicative of the terrestrial radio network node being configured to facilitate delivery of a non-terrestrial uplink traffic flow associated with an established non-terrestrial communication session between the user equipment and a non-terrestrial network node;

determining that delivery of the non-terrestrial uplink traffic flow is to be facilitated by the terrestrial radio network node;

establishing a terrestrial connection with the terrestrial radio network node to result in an established terrestrial connection, wherein the established terrestrial connection is usable to facilitate communication of the non-terrestrial uplink traffic flow associated with the established non-terrestrial communication session, and wherein downlink traffic associated with the established non-terrestrial communication session is facilitated by the non-terrestrial network node; and transmitting, to the terrestrial radio network node via the established terrestrial connection, at least a portion of the non-terrestrial uplink traffic flow.

14. The user equipment of claim 13, wherein the determining that the delivery of the non-terrestrial uplink traffic flow is to be facilitated by the terrestrial radio network node comprises receiving, from the non-terrestrial network node, a traffic-relaying indication indicative that the user equipment is to offload the delivery of non-terrestrial uplink traffic flow to the terrestrial radio network node.

15. The user equipment of claim 13, wherein the determining that the delivery of the non-terrestrial uplink traffic flow is to be facilitated by the terrestrial radio network node comprises determining that a battery charge value corresponding to the user equipment is not greater than a value defined by a configured battery charge criterion.

16. The user equipment of claim 13, wherein the operations further comprise:

transmitting, to the terrestrial radio network node, non-terrestrial control information corresponding to the established non-terrestrial communication session, wherein the non-terrestrial control information is to be directed, by the terrestrial radio network node, to the non-terrestrial network node.

17. A non-transitory machine-readable medium, comprising executable instructions that, when executed by at least one processor of a user equipment, facilitate performance of operations, comprising:

receiving, via a broadcast by a terrestrial radio network node using a system information block message, a non-terrestrial uplink traffic relaying service class indication indicative of the terrestrial radio network node being configured to facilitate delivery of a non-terrestrial uplink traffic flow associated with an established non-terrestrial communication session between the user equipment and a non-terrestrial network node;

determining that delivery of the non-terrestrial uplink traffic flow is to be facilitated by the terrestrial radio network node;

establishing a terrestrial connection with the terrestrial radio network node to result in an established terrestrial connection, wherein the established terrestrial connection is to be usable to facilitate communication of the non-terrestrial uplink traffic flow associated with the established non-terrestrial communication session, and wherein downlink traffic associated with the established non-terrestrial communication session is facilitated by the non-terrestrial network node; and transmitting, to the terrestrial radio network node according to the established terrestrial connection, at least a portion of the non-terrestrial uplink traffic flow.

18. The non-transitory machine-readable medium of claim 17, wherein the determining that the delivery of the non-terrestrial uplink traffic flow is to be facilitated by the terrestrial radio network node comprises receiving, from the non-terrestrial network node, a traffic-relaying indication indicative that the user equipment is to offload the delivery of the non-terrestrial uplink traffic flow to the terrestrial radio network node.

19. The non-transitory machine-readable medium of claim 17, wherein the user equipment operates in an idle mode with respect to the terrestrial radio network node before the established terrestrial connection was established.

20. The non-transitory machine-readable medium of claim 17, wherein the operations further comprise:

transmitting, to the non-terrestrial network node, a traffic-relaying indication indicative that the user equipment is to offload the delivery of the non-terrestrial uplink traffic flow to the terrestrial radio network node.

* * * * *